US011675072B2

(12) United States Patent
Lee

(10) Patent No.: US 11,675,072 B2
(45) Date of Patent: Jun. 13, 2023

(54) MOBILE ROBOT AND METHOD OF CONTROLLING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 723 days.

(21) Appl. No.: 16/490,372

(22) PCT Filed: May 31, 2019

(86) PCT No.: PCT/KR2019/006616
§ 371 (c)(1),
(2) Date: Aug. 30, 2019

(87) PCT Pub. No.: WO2020/241950
PCT Pub. Date: Dec. 3, 2020

(65) Prior Publication Data
US 2021/0333391 A1   Oct. 28, 2021

(51) Int. Cl.
*G01S 15/86* (2020.01)
*G01S 17/931* (2020.01)
*G01S 7/481* (2006.01)
*G01S 15/931* (2020.01)

(52) U.S. Cl.
CPC ............ *G01S 15/86* (2020.01); *G01S 7/4817* (2013.01); *G01S 15/931* (2013.01); *G01S 17/931* (2020.01)

(58) Field of Classification Search
CPC ...... G01S 15/86; G01S 17/931; G01S 7/4817; G01S 15/931; G05D 1/024; G05D 1/0255; B25J 5/007; B25J 19/02
See application file for complete search history.

(56) References Cited

U.S. PATENT DOCUMENTS

| 4,638,445 A | 1/1987 | Mattaboni |
| 2012/0197464 A1* | 8/2012 | Wang ................. G06F 3/04842 |
| | | 701/28 |
| 2013/0226344 A1 | 8/2013 | Wong et al. |
| 2013/0326839 A1* | 12/2013 | Cho ..................... G05D 1/0246 |
| | | 701/2 |

(Continued)

FOREIGN PATENT DOCUMENTS

| JP | 2015-518188 | 6/2015 |
| KR | 10-0669892 | 1/2007 |
| KR | 10-2009-0112984 | 10/2009 |

(Continued)

OTHER PUBLICATIONS

International Search Report dated Mar. 2, 2020 issued in Application No. PCT/KR2019/006616.

*Primary Examiner* — Ig T An
(74) *Attorney, Agent, or Firm* — KED & Associates LLP

(57) ABSTRACT

Disclosed is an autonomous mobile robot including a main body, and a driving part positioned below the main body and configured to move the main body, wherein the driving part includes a rotation part that is rotatably provided and is configured to dispose a sensor module including one or more sensors outwards, a base positioned below the rotation part, and a driving wheel installed on the base, thereby embodying a sensing system with low cost and high efficiency.

10 Claims, 14 Drawing Sheets

(56) References Cited

U.S. PATENT DOCUMENTS

2018/0025498 A1* 1/2018 Omari .................. G01C 21/165
                                                                     348/144
2019/0248014 A1* 8/2019 Deyle .................... B25J 13/006

FOREIGN PATENT DOCUMENTS

| KR | 10-1061367 | 9/2011 |
| KR | 10-1706222 | 2/2017 |

* cited by examiner

MOBILE ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2019/006616, filed May 31, 2019.

TECHNICAL FIELD

The present invention relates to an autonomous mobile robot and a method of controlling the same, and more particularly, to a mobile robot that embodies a sensing system with low cost and high efficiency to effectively travel, and a method of controlling the same.

BACKGROUND ART

Robots have been developed for industrial use to manage some parts of factory automation. Recently, application fields of robots have been further expanded to develop medical robots, aerospace robots, etc. and to manufacture robots used in a general home for domestic use. Among such robots, an autonomous mobile robot is referred to as a mobile robot.

A mobile robot includes a plurality of sensors for autonomous and free movement and avoiding an obstacle or the like during traveling and is capable of traveling while avoiding an obstacle.

In general, an infrared sensor or an ultrasonic sensor is used for obstacle detection of a mobile robot. The infrared sensor determines the presence of an obstacle and a distance therefrom through light intensity of reflected light that is reflected by the obstacle and returns back to the sensor or time take to receive the reflected light, and the ultrasonic sensor determines a distance from an obstacle using a time difference between a time point at which ultrasonic waves are emitted and a time point at which the ultrasonic waves are reflected by an obstacle and return back to the sensor when there are ultrasonic waves with a predetermined period, which are emitted and are reflected by an obstacle.

In order to enable a mobile robot to perform a set operation while traveling, it is required to accurately generate a map of a traveling area and to accurately recognize a current position of the mobile robot on the map.

Recognition and avoidance of an obstacle in the traveling area largely affects traveling performance of the mobile robot, and thus there is a need to ensure reliability of obstacle recognition capability.

Cited reference (Korean Patent Publication No. 10-0669892) discloses recognition technology with high reliability by combining an infrared sensor and an ultrasonic sensor.

A mobile robot detects an obstacle on a traveling path using various forward detection sensors such as a light detection and ranging (LiDAR) sensor, a camera light vision sensor, a depth sensor, or an ultrasonic sensor while being moved, and writes a map or avoids the obstacle using the detected information.

In this case, an object next to or behind the traveling path needs to be detected in some situations, and to this end, there are various problems in terms of an increase in costs, space limitations, or the like when various sensors are further installed.

DISCLOSURE

Technical Problem

It is an object of the present invention to provide a mobile robot that embodies a sensing system with low cost and high efficiency to effectively travel, and a method of controlling the same.

It is an object of the present invention to provide a mobile robot and a method of controlling the same for performing obstacle recognition and avoidance operation with high reliability because the obstacle is effectively recognized using a rotatable sensor.

It is an object of the present invention to provide technology of effectively and accurately recognizing a position within a traveling area.

It is an object of the present invention to provide more effective simultaneous localization and mapping (SLAM) technology using different rotatable sensors.

Technical Solution

To achieve the objects, a mobile robot and a method of controlling the same may embody a sensing system with low cost and high efficiency using a rotatable sensor.

In accordance with the present invention, the above and other objects can be accomplished by the provision of a mobile robot including a main body, and a driving unit positioned below the main body and configured to move the main body, wherein the driving unit includes a rotation unit that is rotatably provided and is configured to dispose a sensor module including one or more sensors outwards, a base positioned below the rotation unit, and a driving wheel installed on the base, thereby embodying a sensing system with low cost and high efficiency.

The rotation unit may include a plurality of rotation units that are stacked in upward and downward directions and are independently rotatable. Here, rotation units on different layers may include different types of sensors. In addition, the rotation unit may fix one sensor, which detects a predetermined object, to detect the detected object and may rotate remaining sensors to orient the remaining sensors in different directions among different types of sensors The rotation unit may include a first sensor rotation unit disposed at an upper side and a second sensor rotation unit disposed at a lower side, a sensor module including at least one of a light detection and ranging (LiDAR) sensor or a depth sensor may be disposed on the first sensor rotation unit, and a sensor module including an ultrasonic sensor may be disposed on the second sensor rotation unit. In this case, the first sensor rotation unit may be rotated to orient a sensing direction of the sensor module towards a non-detection area, and the second sensor rotation unit may be rotated to orient the ultrasonic sensor towards a forward side of a traveling direction.

In accordance with another aspect of the present invention, there is provided a method of controlling a mobile robot including acquiring sensing data through a plurality of sensor modules during traveling, determining whether one or more sensor modules need to rotate based on the sensing data, determining a sensor module as a rotation target when rotation is needed, and rotating a rotation unit disposed on the determined sensor module as the rotation target, and thus the mobile robot may effectively travel.

The determining whether rotation is needed may include determining that rotation is needed when a non-detection area that is not previously detected is detected, and the rotating may include fixing a rotation unit, on which a sensor module including an ultrasonic sensor is disposed, to a front side in a traveling direction and rotates a rotation unit, on which a sensor module including a LiDAR sensor is disposed, to orient a sensing direction of the LiDAR sensor towards the non-detection area.

The determining whether rotation is needed may include determining that rotation is needed when some of the plurality of sensor modules detect a predetermined object and the others of the sensor modules do not detect the predetermined object, and the rotating may include fixing at least one of the sensor module, which detects the predetermined object, to detect the detected object, and rotating the rotation unit to orient the remaining sensor modules in a different direction. In this case, the rotation unit may be operated to orient the remaining sensor modules towards a forward side of a traveling direction.

Advantageous Effects

According to at least one of embodiments of the present invention, a sensing system with low cost and high efficiency may be embodied to effectively perform traveling.

According to at least one of embodiments of the present invention, an obstacle may be effectively recognized using a rotatable sensor, and thus an obstacle recognition and avoidance operation with high reliability may be performed.

According to at least one of embodiments of the present invention, technology of effectively and accurately recognizing a position within a traveling area may be provided.

According to at least one of embodiments of the present invention, more effective simultaneous localization and mapping (SLAM) technology using different rotatable sensors may be provided.

Various other effects of the present invention will be directly or suggestively disclosed in the following detailed description of the invention.

BEST MODE

The present invention will now be described more fully with reference to the accompanying drawings, in which exemplary embodiments of the invention are shown. The invention may, however, be embodied in many different forms and should not be construed as being limited to the embodiments set forth herein.

The suffixes "module" and "unit" of elements herein are used for convenience of description and do not have any distinguishable meanings or functions. Accordingly, the "module" and "unit" may be used interchangeably.

The terms such as "first" and "second" are used herein merely to describe a variety of constituent elements, but the constituent elements are not limited by the terms. The terms are used only for the purpose of distinguishing one constituent element from another constituent element.

Figure 1:
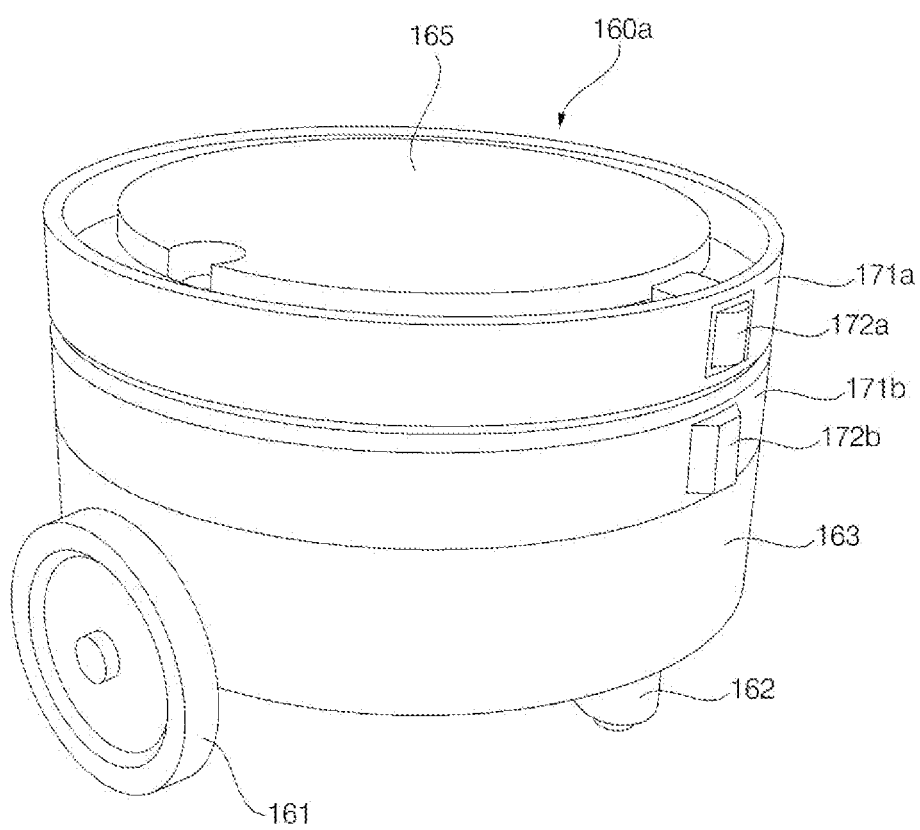
FIG. 1 is a perspective view showing a driving unit of a mobile robot according to an embodiment of the present invention.
Figure 2:
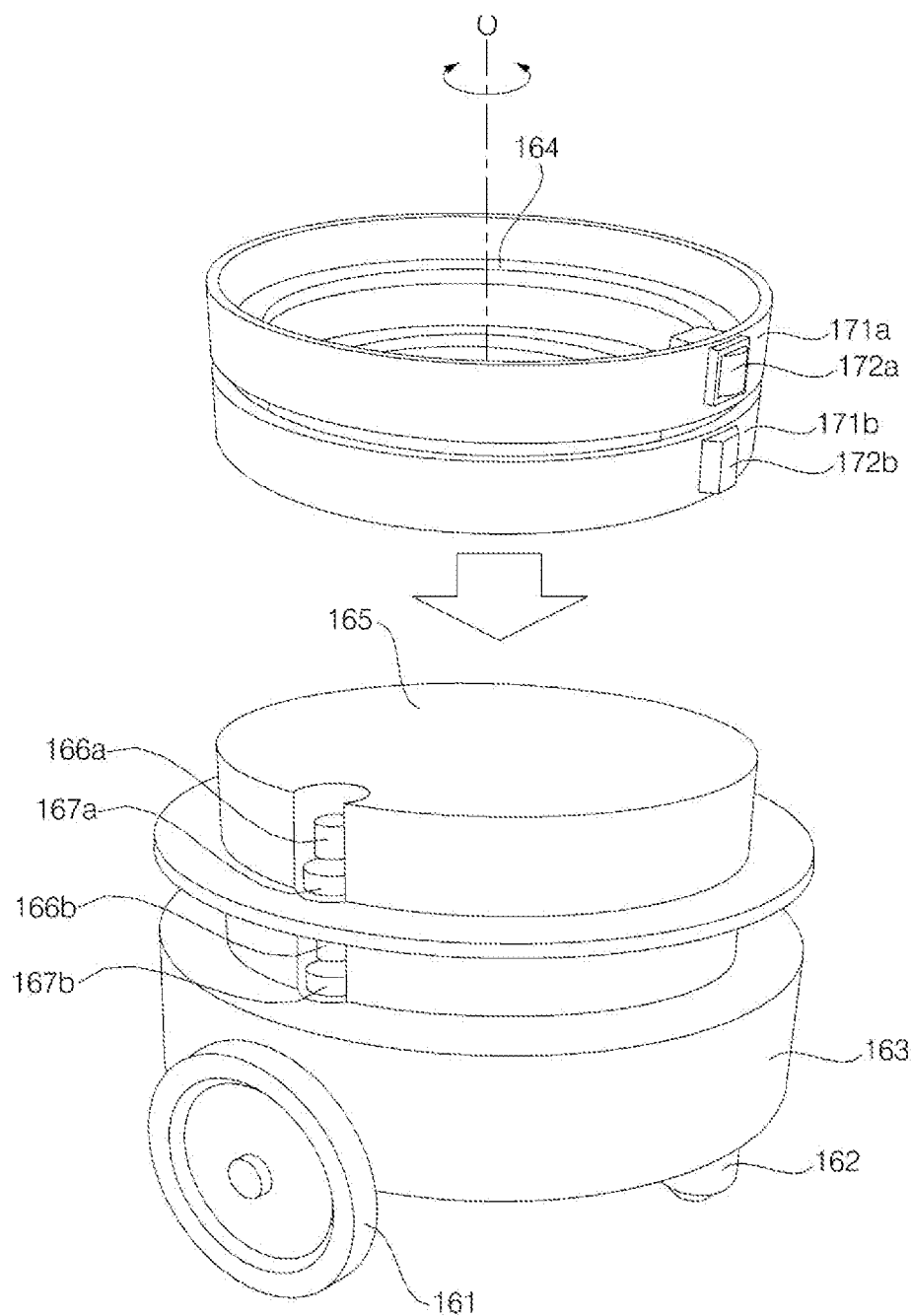
FIG. 2 is a diagram showing main components of the driving unit shown in FIG. 1.

FIG. 1 is a perspective view showing a driving unit of a mobile robot according to an embodiment of the present invention. FIG. 2 is a diagram showing main components of the driving unit shown in FIG. 1.

Figure 3:
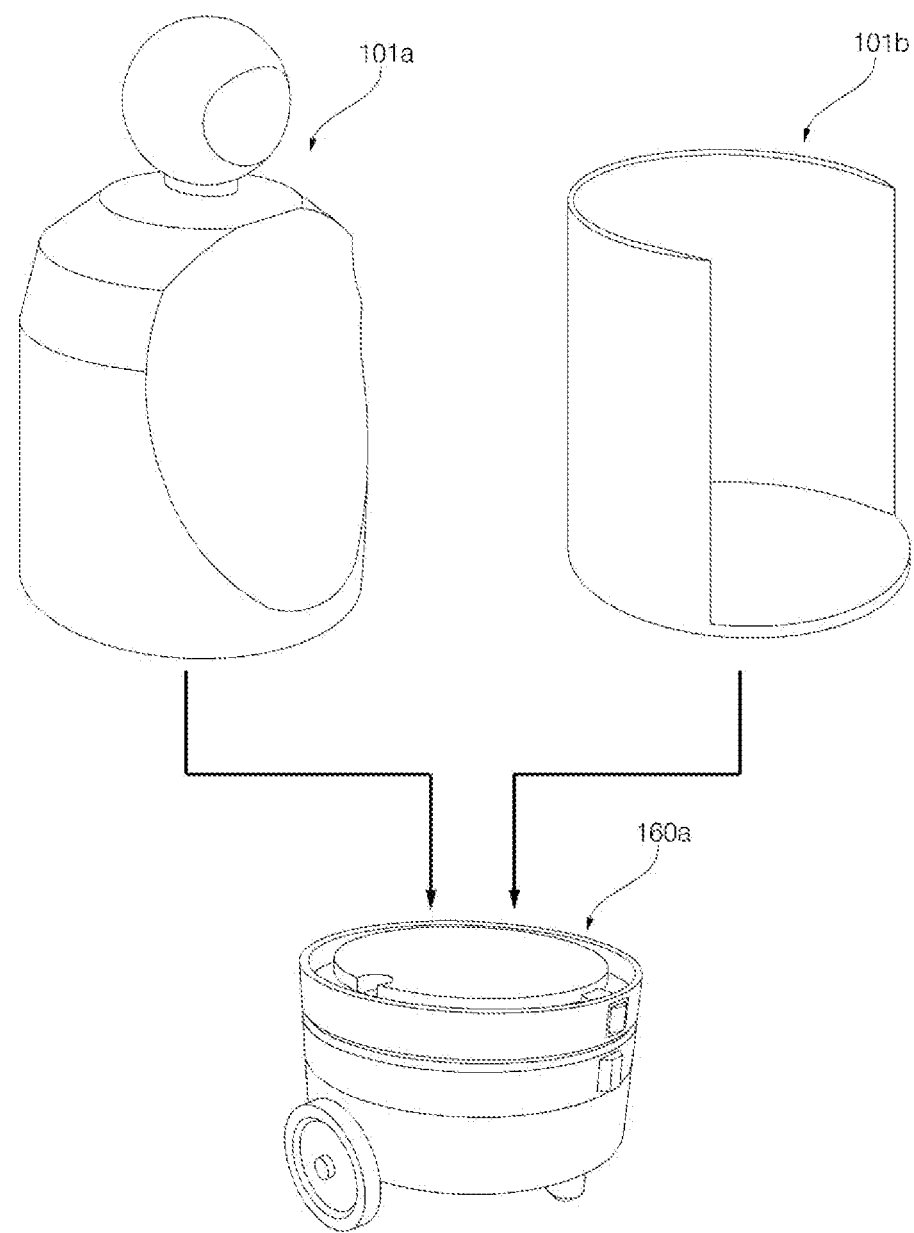
FIGS. 3, 4A, and 4B are diagrams for explanation of a main body and a mobile robot that are coupled to a driving unit according to an embodiment of the present invention.
Figure 4A:
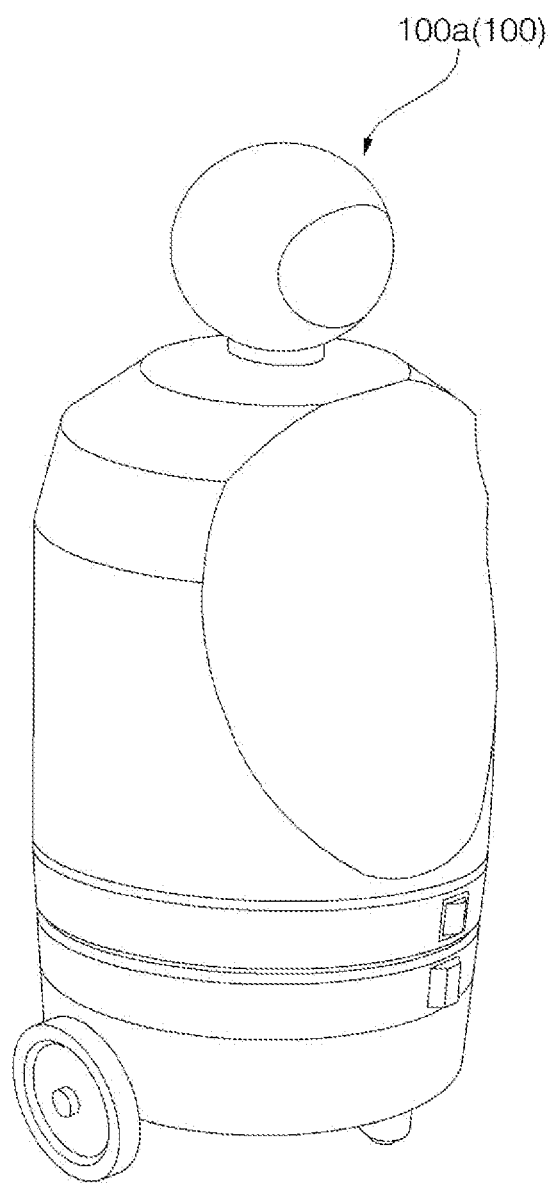
Figure 4B:
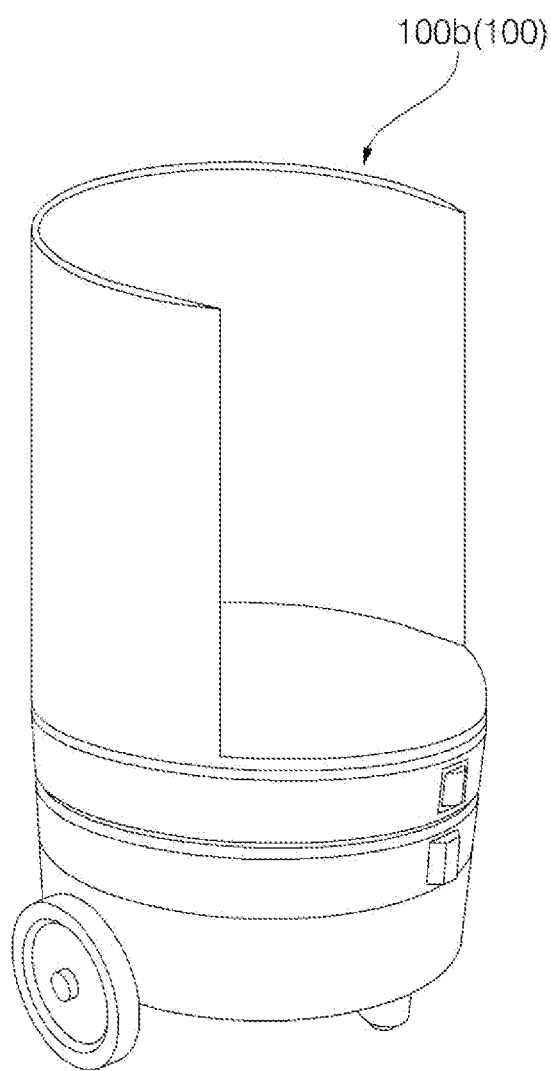

FIGS. 3, 4A, and 4B are diagrams for explanation of a main body and a mobile robot that are coupled to a driving unit according to an embodiment of the present invention.

Referring to the drawings, mobile robots 100, 100a, and 100b according to an embodiment of the present invention may include main bodies 101a and 101b, and a driving unit 160c positioned below the main bodies 101a and 101b and configured to move the main bodies 101a and 101b.

For example, the mobile robot 100 may commonly include a wheel 161, and a traveling driving unit 160a that includes a motor or the like and is in charge of traveling. The mobile robot 100 may further include the main bodies 101a and 101b according to usage environments and uses.

The traveling driving unit 160a may be coupled to a lower side of the main bodies 101a and 101b and may be in charge of a traveling function of moving the main bodies 101a and 101b.

A guidance robot 100a that provides an escort service for guidance of a predetermined place, object, or service or for directly guiding a user while moving to a specific destination may include the main body 101a and the traveling driving unit 160a. According to an embodiment, the main body 101a may include a display, a microphone, a speaker, or the like, which is in charge of an interaction with a user.

The main body 101a of the guidance robot 100a may include a display (not shown) to display a predetermined image such as a user interface image.

The guidance robot 100a may display a user interface (UI) image including an event, advertisement, guidance information, or the like on the display. The display may be configured with a touchscreen and may be used as an input device.

The guidance robot 100a may receive user input in the form of touch, sound input, or the like and may display information on an object and a place, which corresponds to the user input, on a screen of the display.

In some embodiments, the guidance robot 100a may include a scanner for identifying a ticket, an air ticket, a bar code, a QR code, or the like for guidance.

The guidance robot 100a may provide an escort service for directly guiding a user while moving to a specific destination when a user request is present.

A delivery robot 100b may guide peoples about a specific position or may transport loads while autonomously traveling in a predetermined place. The delivery robot 100b may follow a user while maintaining a predetermined distance with the user.

In some embodiments, the delivery robot 100b may include a weight sensor for sensing the weight of transported loads and may guide the user about the weight of loads, detected by the weight sensor.

The main body 101b of the delivery robot 100b may user a modular design in order to an optimized service according to usage environments and uses.

The main body 101b of the delivery robot 100b may further include a transport service module for accommodating loads. The transport service module may be configured according to a type and shape of loads as a delivery target. For example, when the delivery robot 100b delivers served articles such as a towel, a toothbrush, toothpaste, bath supplies, bedding, beverage, food, a room service, or other small home appliances in a hotel, the transport service module may be manufactured to effectively accommodate the served articles. When the delivery robot 100b functions as a cart in the market, the transport service module may be manufactured in the form of a cart for accommodating purchased goods of a customer. In addition, the transport service module may include a scanner for recognizing a bar code or QR code of a purchased good, or the like.

The traveling driving unit 160a and the main bodies 101a and 101b may be mechanically coupled to each other. The traveling driving unit 160a and the main bodies 101a and 101b may be conductibly connected to each other and may transmit and receive a signal. Accordingly, the traveling driving unit 160a and the main bodies 101a and 101b may be organically operated.

The traveling driving unit 160a may include a rotation unit 170a, which is rotatably provided and includes sensor modules 172a and 172b having one or more sensors and disposed outwards, and a driving platform 160b positioned below the rotation unit 170a and configured to accommodate a circuit board including a control unit or internal components therein.

The driving platform 160b may include a base 163 disposed below the rotation unit 170a and the driving wheel 161 installed on the base 163.

The driving platform 160b may include a castor 162. The castor 162 may control balance of the mobile robot 100, may support the mobile robot 100, and may assist traveling of the mobile robot 100.

The driving platform 160b may include a fixing unit 165 that is positioned inside the rotation unit 170a, supports the rotation unit 170a, and includes a rotation device thereon for rotation of the rotation unit 170a.

The rotation unit 170a may include a plurality of rotation units 171a and 171b that are stacked in upward and downward directions and are independently rotated. For example, the rotation unit 170a may have a two-layered structure having a first sensor rotation unit 171a disposed at an upper side and a second sensor rotation unit 171b disposed at a lower side. Accordingly, a sensor module disposed on each of the rotation units 171a and 171b may be rotated and may then be fixed to be oriented in a desired sensing direction.

Motors 166a and 166b, and gear structures 167a and 167b for rotation of the rotation unit 170a may be disposed inside/outside the fixing unit 165.

For example, a first rotation motor 166a and a first motor axis spur gear 167a for rotation of the first sensor rotation unit 171a may be disposed at an upper side of the fixing unit 165 and a second rotation motor 166b and a second motor axis spur gear 167b for rotation of the second sensor rotation unit 171b may be disposed at a lower side of the fixing unit 165.

The first motor axis spur gear 167a and the second motor axis spur gear 167b may be engaged with internal spur gears 164 of the first sensor rotation unit 171a and the second sensor rotation unit 171b, respectively, and as rotation force is transmitted based on driving of the first rotation motor 166a and the second rotation motor 166b, the first sensor rotation unit 171a and the second sensor rotation unit 171b may be rotated.

The first sensor rotation unit 171a and the second sensor rotation unit 171b may be rotated clockwise or counterclockwise based on a rotation axis O.

The rotation devices 166a, 166b, 167a, and 167b exemplified in FIG. 2 are exemplary and the present invention is not limited thereto. The first sensor rotation unit 171a and the second sensor rotation unit 171b may not be rotated and only the sensor modules 172a and 172b may be rotatably configured. Accordingly, in the specification, the expression 'sensor rotates' may mean that the sensor modules 172a and 172b are oriented towards a specific intended direction and may mean that the sensor rotation units sensor 171a and 172b, the sensor modules 172a and 172b, or other devices rotate such that the sensor modules 172a and 172b are oriented towards a specific intended direction.

In detail, sensor modules including different types of sensors may be disposed on rotation units on different layers. For example, the first sensor module 172a disposed on the first sensor rotation unit 171a may include one or more a different type of sensor different from the second sensor module 172b disposed on the second sensor rotation unit 171b. In more detail, a sensor of the first sensor module 172a disposed on the first sensor rotation unit 171a may be entirely differently configured from a sensor of the second sensor module 172b disposed on the sensor rotation unit 171b such that the sensor configurations do not overlap each other.

Figure 5:
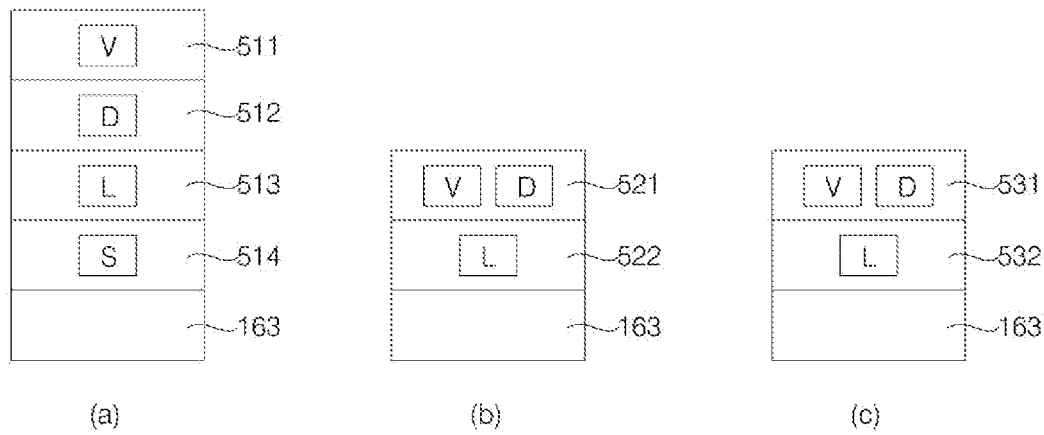
FIG. 5 is a diagram showing examples of arrangement of a rotation unit and a sensor according to an embodiment of the present invention.

FIG. 5 is a diagram showing examples of arrangement of a rotation unit and a sensor according to an embodiment of the present invention.

Referring to FIG. 5A, four-layered rotation units 511, 512, 513, and 514 may be disposed on the base 163. In this case, different sensors V, D, L, and S may be disposed on the four-layered rotation units 511, 512, 513, and 514, respectively.

For example, a vision sensor V may be disposed on the uppermost rotation unit 511, a depth sensor D may be disposed on the second uppermost rotation unit 512, a light detection and ranging (LiDAR) sensor L may be disposed on the second lowermost rotation unit 513, and an ultrasonic sensor S may be disposed on the lowermost rotation unit 514.

Referring to FIG. 5B, two-layered rotation units 521 and 522 may be disposed on the base 163. In this case, different sensors V, D, and L may be disposed on the two-layered rotation units 521 and 522.

For example, the vision sensor V and the depth sensor D may be disposed on the upper rotation unit 521 and the LiDAR sensor L may be disposed on the lower rotation unit 522.

The vision sensor V and the depth sensor D may be included in one complex sensor module. Alternatively, the vision sensor V and the depth sensor D may be separate independent sensor modules.

Referring to FIG. 5C, two-layered rotation units 531 and 532 may be disposed on the base 163. In this case, different sensors L, D, and S may be disposed on the two-layered rotation units 531 and 532.

For example, the LiDAR sensor L and the depth sensor D may be disposed on the upper rotation unit 531, and the ultrasonic sensor S may be disposed on the lower rotation unit 532.

The LiDAR sensor L and the depth sensor D may be included in one complex sensor module. Alternatively, the LiDAR sensor L and the depth sensor D may be separate independent sensor modules.

Figure 6:
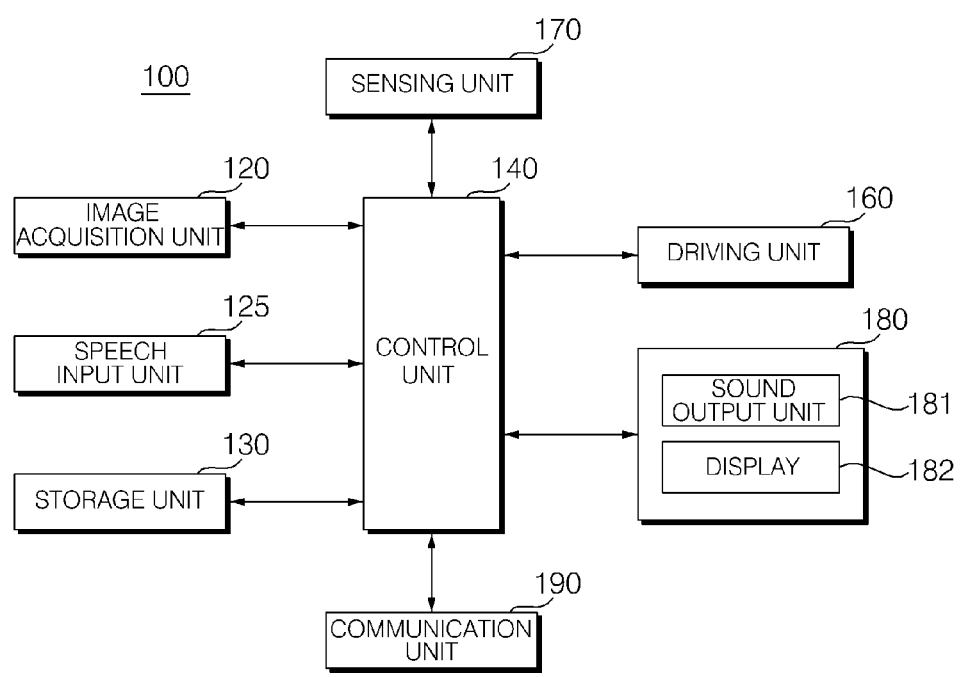
FIG. 6 is a schematic internal block diagram showing a robot according to an embodiment of the present invention.

The rotation unit 170a may fix one sensor, which detects a predetermined object, to detect the detected object and may rotate the remaining sensors to orient the remaining sensors in different directions among different types of sensors under the control of the control unit 140 (refer to FIG. 6).

When the rotation unit 170a is configured with two layers, the first sensor module 172a disposed on the first sensor rotation unit 171a may include the second sensor module 172b disposed on the second sensor rotation unit 171b and one or more different types of sensors.

A sensor module including at least one of the LiDAR sensor L and the depth sensor D may be disposed on the first sensor rotation unit 171a disposed at the upper side, and a sensor module including the ultrasonic sensor S may be disposed on the second sensor rotation unit 171b disposed at the lower side.

In this case, under the control of the control unit 140, the first sensor rotation unit 171a may rotate a sensing direction of a sensor module including at least one of the LiDAR sensor L and the depth sensor D such that a sensing direction of the sensor module is oriented towards a non-detection area and may rotate the second sensor rotation unit 171b such that a traveling direction of the ultrasonic sensor S is oriented forwards.

According to an embodiment of the present invention, one or more rotation units 170a of the mobile robot 100 may include a separate sensor module or a complex sensor module including a LiDAR sensor, a depth sensor, an ultrasonic sensor, an infrared sensor, or the like, and the rotation unit 170a may rotate around the mobile robot 100 by 360 degrees to detect surroundings.

Whether additional information such as a non-detection area is required may be determined based on map information established based on pre-input sensing data of a sensor module and the rotation speed and rotation direction of the sensor module may be determined to intensively sense the non-detection area.

As such, the sensor module is positioned to be oriented in an appropriate direction for self-position recognition and sensing of information required to generate a map, and thus, when the same object detection sensor is used, more accurate information may be acquired and map generating capability and wayfinding capability may be enhanced.

That is, according to the present invention, a specific sensor may be selected in consideration of geographical features and areas as a detection target and the selected sensor may be oriented in the direction, and thus the map may be more rapidly generated and a path may be found.

In particular, when only object information on a traveling direction is normally provided during generation of a map of the mobile robot 100 and detailed surrounding information of a lateral surface is not input, a time taken to generate the map may be disadvantageously prolonged because a map with low completeness is configured or many areas need to be searched for. The present invention may overcome the disadvantages.

In order to detect the non-detection area, the mobile robot 100 may not directly move in all non-detection areas and may not return, but instead, one or more sensors may be installed on the rotation unit 170a, and the sensor may be appropriately rotated and may detect a corresponding direction while maintaining straining traveling if possible, and thus required sensor data of a direction required to generate a map may be accurately received irrespective of a traveling direction, thereby enhancing simultaneous localization and mapping (SLAM) performance.

According to the present invention, the number of sensors that were installed in all directions corresponding to 360 degrees around the mobile robot 100 may be installed in only one direction and may be rotated, and thus a low number of expensive sensors may be used, thereby remarkably reducing costs.

FIG. 6 is a schematic internal block diagram showing a robot according to an embodiment of the present invention.

Referring to FIG. 6, the mobile robot 100 according to an embodiment of the present invention may include the control unit 140 for controlling the overall operation of the mobile robot 100, the driving unit 160 including the traveling driving unit 160a for moving the main bodies 101a and 101b, and a sensor unit 170 including a plurality of sensors for acquiring data required for traveling and operating.

The mobile robot 100 according to an embodiment of the present invention may include a storage unit 130 for storing various data, and a communication unit 190 for transmitting and receiving data to and from other devices such as a server or other robots.

The control unit 140 may control the storage unit 130, the communication unit 190, the driving unit 160, the sensor unit 170, an output unit 180, or the like within the mobile robot 100 and may control an overall operation of the mobile robot 100.

In some embodiments, the mobile robot 100 may use artificial intelligence trained to recognize at least one of the attributes of a user, speech, or space, or the attributes of an object such as an obstacle.

The mobile robot 100 according to an embodiment of the present invention may include artificial neural networks (ANN) in the form of software or hardware that is trained using machine learning.

According to an embodiment of the present invention, the mobile robot 100 may include a deep neural network (DNN) trained using deep learning, such as a convolutional neural network (CNN), a recurrent neural network (RNN), or a deep belief network (DBN). For example, the deep neural network (DNN), such as the convolutional neural network (CNN), may be provided in the control unit 140 or the storage unit 130.

The storage unit 130, which stores various kinds of information necessary to control the robot 100, may include a volatile or nonvolatile recording medium. Examples of the recording medium, which stores data readable by a microprocessor, may include a hard disk drive (HDD), a solid state disk (SSD), a silicon disk drive (SDD), a ROM, a RAM, a CD-ROM, a magnetic tape, a floppy disk, and an optical data storage device.

The control unit 140 may perform control to transmit an operation state, user input, or the like of the mobile robot 100 to the server or the like through the communication unit 190.

The communication unit 190 may include at least one communication module, through which the mobile robot 100 may be connected to the Internet or to a predetermined network and may communicate with another device.

In addition, the communication unit 190 may be connected to a communication module provided in the server in order to process transmission and reception of data between the mobile robot 100 and the server.

The communication unit 190 may communicate with other devices such as a network, a server, other robots, or the like using wireless communication. In particular, the communication unit 190 may transmit and receive data using 5G communication to process a large amount of data at rapid speed.

The mobile robot 100 according to an embodiment of the present invention may further include a speech input unit 125 for receiving user speech input through a microphone.

The speech input unit 125 may include or may be connected to a processing unit for converting analog sound into digital data such that a user speech input signal can be recognized by the control unit 140 or the server.

The storage unit 130 may store data for speech recognition, and the control unit 140 may process the user speech input signal received through the speech input unit 125, and may perform a speech recognition process.

The speech recognition process may be performed by the server rather than being by the mobile robot 100 itself. In this case, the control unit 140 may control the communication unit 190 to transmit the user input speech signal to the server.

Simple speech recognition may be performed by the mobile robot 100 and high-level speech recognition such as processing of a natural language may be performed by the server.

The control unit 140 may perform control such that the robot 100 performs a predetermined operation based on the result of speech recognition.

The mobile robot 100 may include the output unit 180 in order to display predetermined information in the form of an image or to output the predetermined information in the form of sound.

The output unit 180 may include a display 182 for displaying information corresponding to a command input by a user, the result of processing the command input by the user, the operation mode, the operation state, and an error state in the form of an image. In some embodiments, the robot 100 may include a plurality of displays 182.

In some embodiments, at least some of the displays 182 may be connected to a touchpad in a layered structure so as to constitute a touchscreen. In this case, the display 182 constituting the touchscreen may also be used as an input device for allowing a user to input information by touch, in addition to an output device.

The output unit 180 may further include a speech output unit 181 for outputting an audio signal. The speech output unit 181 may output an alarm sound, a notification message about the operation mode, the operation state, and the error state, information corresponding to user command input, and a processing result corresponding to the user command input in the form of sound under the control of the control unit 140. The speech output unit 181 may convert an electrical signal from the control unit 140 into an audio signal, and may output the audio signal. To this end, a speaker may be provided.

In some embodiments, the robot 100 may further include an image acquisition unit 120 for capturing an image of a predetermined range.

The image acquisition unit 120, which captures an image of the surroundings of the robot 100, an external environment, etc., may include a camera module. For capture efficiency, a plurality of cameras may be installed at predetermined positions.

The image acquisition unit 120 may capture an image for user recognition. The control unit 140 may determine an external situation or may recognize a user (a target to be guided) based on the image captured by the image acquisition unit 120.

The control unit 140 may perform control such that the robot 100 travels based on the image captured by the image acquisition unit 120.

The image captured by the image acquisition unit 120 may be stored in the storage unit 130.

The driving unit 160 may move the main bodies 101*a* and 101*b* under the control of the control unit 140. To this end, the driving unit 160 may include the traveling driving unit 160*a* described with reference to FIGS. 1 to 5.

The driving unit 160 may include at least one driving wheel 161 for moving the main bodies 101*a* and 101*b*. The driving unit 160 may include a driving motor (not shown) connected to the driving wheel 161 for rotating the driving wheel 161. The driving wheel 161 may be provided at left and right sides of the main bodies, and will hereinafter be referred to as a left wheel and a right wheel.

The left wheel and the right wheel may be driven by a single driving motor. If necessary, however, a left wheel driving motor for driving the left wheel and the right wheel driving motor for driving the right wheel may be individually provided. The direction in which the main body travels may be changed to the left or to the right based on the difference in the rotational speed between the left wheel and the right wheel.

The mobile robot 100 may include the sensor unit 170 including sensors for sensing various kinds of data related to the operation and state of the mobile robot 100.

The sensor unit 170 may further include an operation sensor for sensing the operation of the robot 100 and outputting operation information. For example, a gyro sensor, a wheel sensor, or an acceleration sensor may be used as the operation sensor.

The sensor unit 170 may include an obstacle sensor for sensing an obstacle. The obstacle sensor may include an infrared sensor, an ultrasonic sensor, an RF sensor, a geomagnetic sensor, a position sensitive device (PSD) sensor, a cliff sensor for sensing whether a cliff is present on a floor within a traveling area, and a light detection and ranging (LiDAR) sensor.

The obstacle sensor senses an object, particularly an obstacle, present in the direction in which the mobile robot 100 travels (moves), and transmits information about the obstacle to the control unit 140. At this time, the control unit 140 may control the motion of the robot 100 depending on the position of the sensed obstacle.

The sensor unit 170 may include various sensors for traveling, and the sensors may be disposed on a rotatable rotating body. For example, at least one of the sensors V, D, L, and S may be disposed on the traveling driving unit 160*a* described with reference to FIGS. 1 to 5.

The control unit 140 may control rotation of the rotation unit 170a on which at least one of the sensors V, D, L, and S is disposed and may optimize a sensing direction and range.

Figure 7:
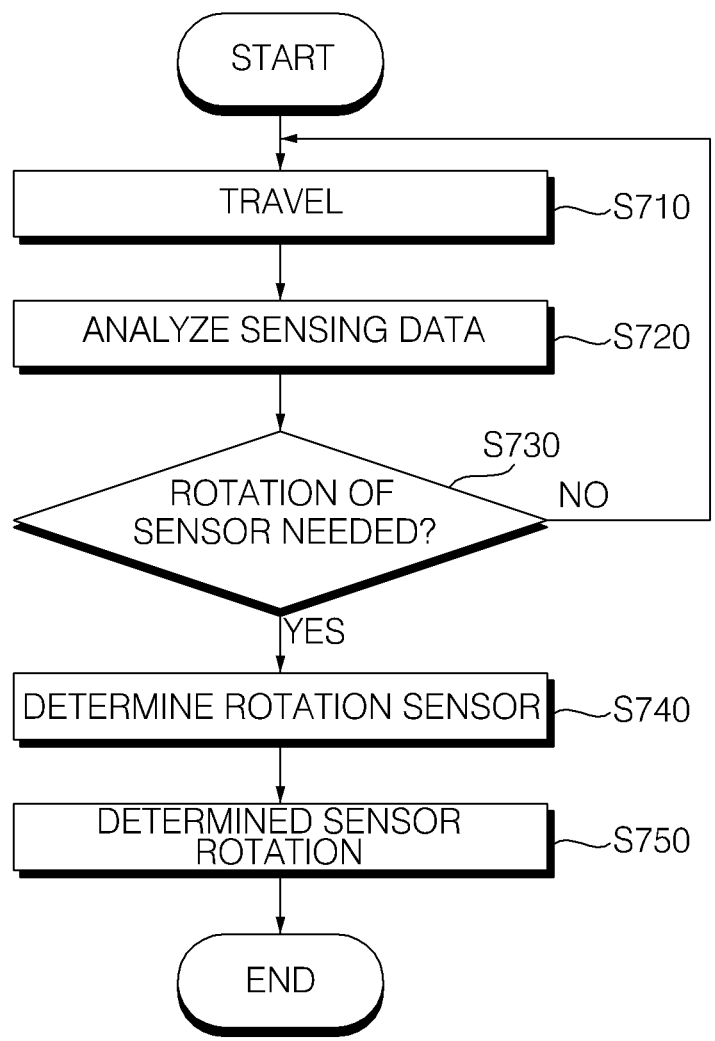
FIG. 7 is a flowchart showing a method of controlling a mobile robot according to an embodiment of the present invention.

FIG. 7 is a flowchart showing a method of controlling a mobile robot according to an embodiment of the present invention.

Referring to FIG. 7, the mobile robot 100 according to an embodiment of the present invention may travel for an operation such as a guidance service, a delivery service, or a SLAM service (S710). According to settings, the mobile robot 100 may move in a predetermined pattern without being on standby in a stationary state or may perform standby-traveling in which the mobile robot 100 is on standby while moving within a set area.

The mobile robot 100 according to an embodiment of the present invention may acquire sensing data such as an operation state, surrounding environment information, or the like of the mobile robot 100 through the sensor unit 170 during traveling (S710).

As described above with reference to FIGS. 1 to 6, the traveling driving unit 160a of the mobile robot 100 according to an embodiment of the present invention may include the rotation unit 170a that is rotatably provided and is disposed to orient the sensor modules 172a and 172b including one or more sensors outwards.

The mobile robot 100 may acquire sensing data of a surrounding environment through the plurality of sensor modules 172a and 172b disposed on the rotation unit 170a during traveling.

The control unit 140 may analyze the sensing data acquired through the sensor modules 172a and 172b to determine required information (S720) and the control unit 140 may determine whether one or more sensor modules 172a and 172b need to be rotated based on the data acquired through the sensor modules 172a and 172b (S730).

For example, the control unit 140 may determine a situation in which a non-detection area that is not previously detected is detected or a situation in which only a specific sensor is capable of performing sensing, as a situation in which rotation is needed.

When rotation is needed (S730), the control unit 140 may determine a rotation target sensor module (S740).

In this case, the control unit 140 may determine the sensor module for sensing the non-detection area or a sensor module for sensing a specific object or a geographical feature, as the rotation target sensor module.

Under the control of the control unit 140, the rotation unit 170a on which the determined rotation target sensor module is disposed may be rotated (S750).

For example, when the non-detection area, which is not previously detected, is detected, the control unit 140 may determine that rotation is needed (S730).

In this case, the control unit 140 may detect the non-detection area and may determine a sensor for acquiring sensing data for map generation as the rotation target sensor module (S740).

In order to acquire additional information of surroundings during a map generating procedure, the mobile robot needs to repeatedly travel in a path in which the mobile robot 100 has traveled. In this case, the mobile robot 100 needs to move towards a position at which information intends to be acquired, and thus a time taken to search for surroundings is prolonged. This is because a sensor of the mobile robot 100 is mainly oriented forwards and thus the detection direction and width resolution of the sensor oriented forwards are limited.

According to the present invention, each sensor may be rotated and disposed in an optimized direction that is analyzed based on the mobile robot 100, and thus data corresponding to the purpose may be collected irrespective of the traveling direction of the robot.

Figure 8:
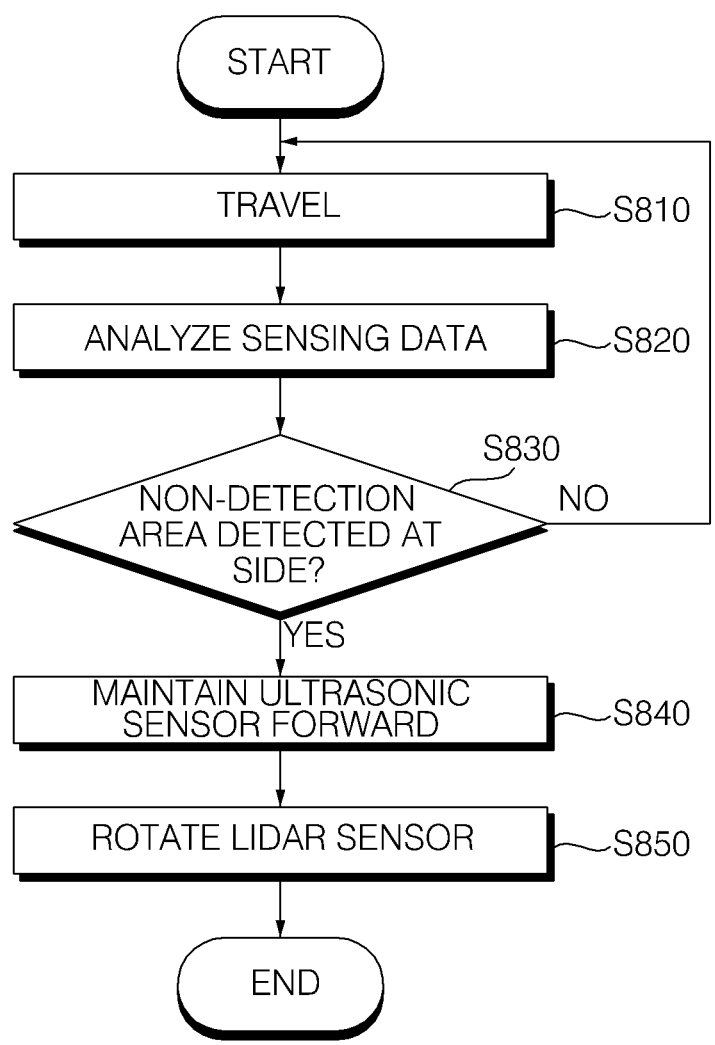
FIG. 8 is a flowchart showing a method of controlling a mobile robot according to an embodiment of the present invention.
Figure 9A:
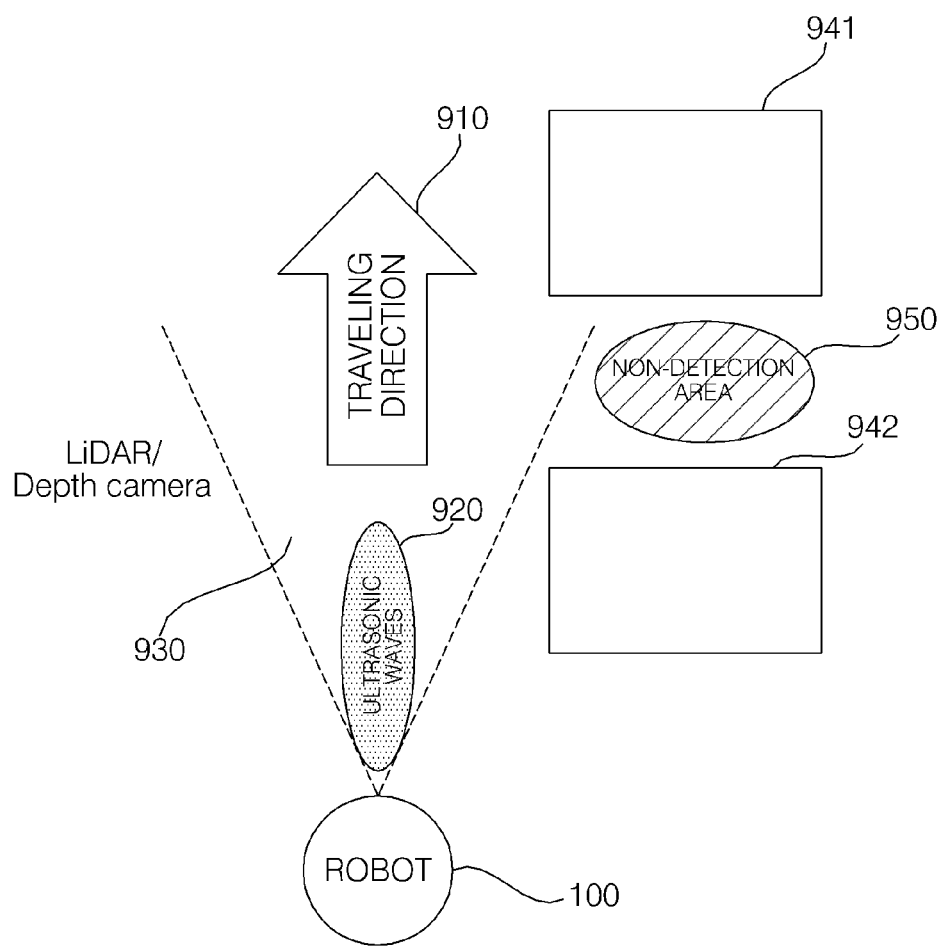
FIGS. 9A to 9C are diagrams for explanation of a method of controlling a mobile robot according to an embodiment of the present invention.
Figure 9B:
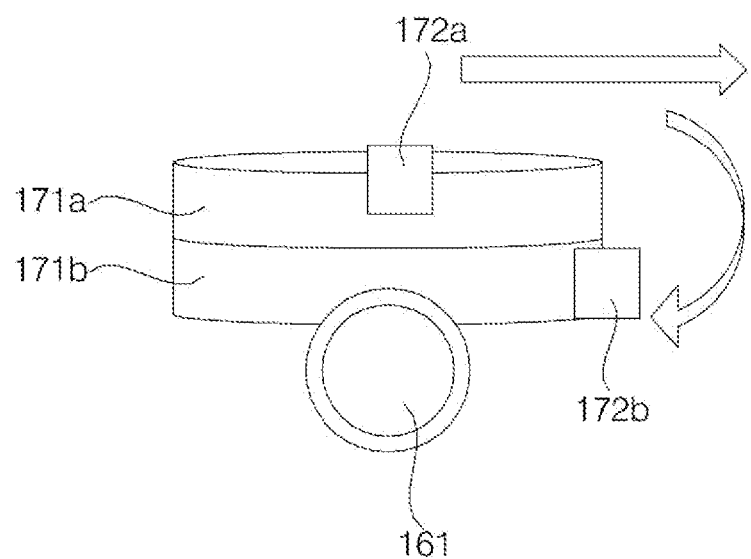
Figure 9C:
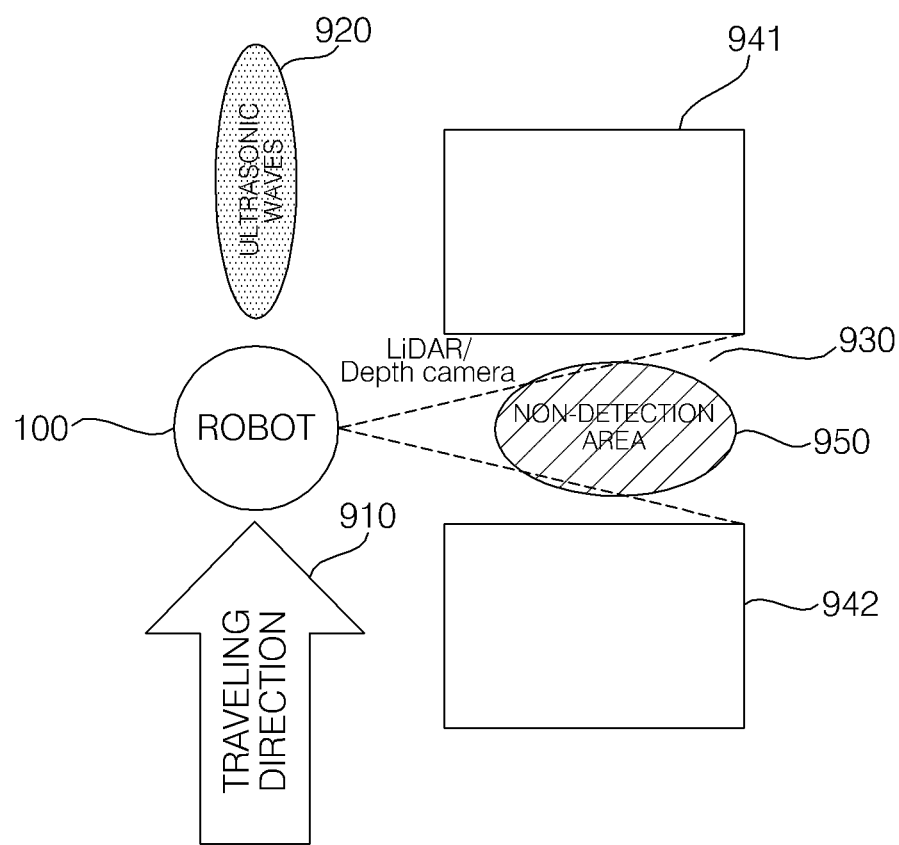

FIG. 8 is a flowchart showing a method of controlling a mobile robot according to an embodiment of the present invention. FIGS. 9A to 9C are diagrams for explanation of a method of controlling a mobile robot according to an embodiment of the present invention.

Referring to FIG. 8, the mobile robot 100 according to an embodiment of the present invention may acquire sensing data through the plurality of sensor modules 172a and 172b disposed on the rotation unit 170a during traveling (S810). The control unit 140 may analyze the sensing data (S820).

When the sensing data is analyzed and a non-detection area 950 is detected at the side of the travelling direction (S830), the control unit 140 may determine that rotation of at least one of the plurality of sensor modules 172a and 172b is needed.

Referring to FIG. 9A, the mobile robot 100 that is straightly moving along a predetermined traveling direction 910 may detect the non-detection area 950 between wall structures 941 and 942, which are previously detected at the side.

For example, when the mobile robot 100 includes the ultrasonic sensor S and the LiDAR sensor L, a sensing area 930 of the LiDAR sensor L may be wider than a sensing area 920 of the ultrasonic sensor S, and thus the LiDAR sensor L may sense presence of the non-detection area 950.

However, when a traveling direction 910 is maintained, the LiDAR sensor L may determine that the non-detection area 950 is present at the right side, but it is not possible to acquire sufficient sensing data for map generation.

Conventionally, in order to acquire sensing data of the non-detection area 950, the mobile robot 100 directly moves, but according to the present invention, a rotation unit on which the LiDAR sensor L is disposed may be rotated and movement of the mobile robot 100 may be minimized.

With reference to the embodiment illustrated in FIG. 9B, the rotation unit 170a may include the first sensor rotation unit 171a on which the sensor module including the LiDAR sensor L is disposed, and the second sensor rotation unit 171b on which the sensor module including the ultrasonic sensor S is disposed.

Referring to FIGS. 9B and 9C, the control unit 140 may perform control to rotate the first sensor rotation unit 171a on which the sensing module including the LiDAR sensor L is disposed, to orient a sensing direction of the LiDAR sensor L towards the non-detection area 950 (S850).

Accordingly, the mobile robot 100 may acquire data required for map generation and may enhance SLAM performance without entering or approaching the non-detection area 950.

The control unit 140 may perform control to fix the second sensor rotation unit 171b on which the sensor module including the ultrasonic sensor S is disposed to the side of a traveling direction 920 to detect an obstacle in the traveling direction and to prevent collision (S840).

When the mobile robot 100 requires surrounding 3D information rather than a path on which the mobile robot previously passes, rotation of the sensor may be used.

According to an embodiment of the present invention, the LiDAR sensor L and the depth sensor D may be disposed on the first sensor rotation unit 171a.

The control unit 140 may analyze the sensing data of the LiDAR sensor L and may recognize presence of an alley 950 that is not detected between the walls 941 and 942 during traveling.

For detailed detection of the alley 950 during movement, the first sensor rotation unit 171a on which the LiDAR sensor L and the depth sensor D are disposed may be rotated by 90 degrees such that the sensing area 930 of the LiDAR sensor L and the depth sensor D are oriented towards the alley 950.

The control unit 140 may detect 3D distance information using the sensing data of the depth sensor D oriented towards the side and may also detect long-distance information of the alley 950 through the LiDAR sensor L.

When some of the plurality of sensor modules detect a predetermined object and the others do not detect the predetermined object, the control unit 140 may determine that rotation is needed.

In this case, the control unit 140 may control an operation of the rotation unit 170a to fix at least one of the sensor modules, which detect the predetermined object, to detect the detected object and to orient the remaining sensor modules in a different direction. The control unit 140 may control the operation of the rotation unit 170a to orient the remaining sensor modules towards a forward side of the traveling direction.

Figure 10:
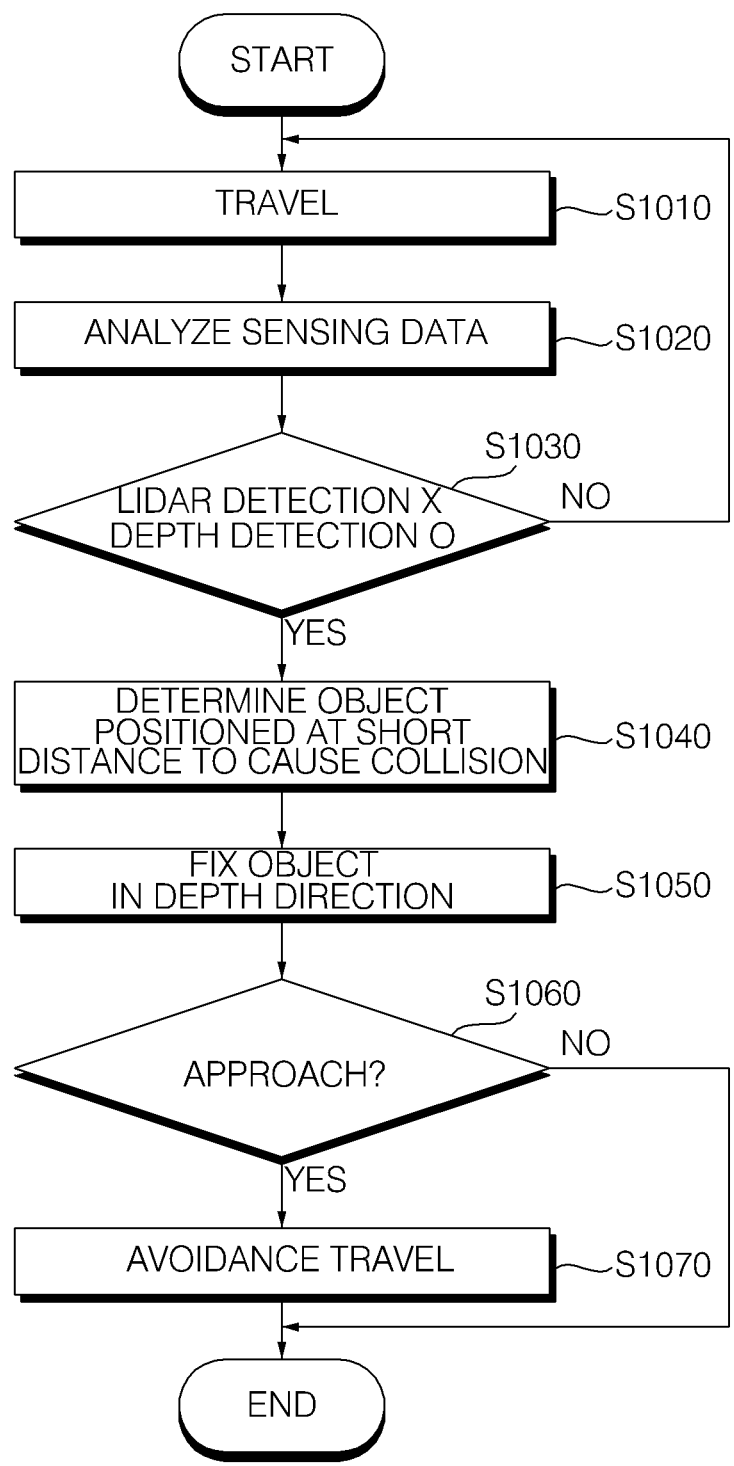
FIG. 10 is a flowchart showing a method of controlling a mobile robot according to an embodiment of the present invention.
Figure 11:
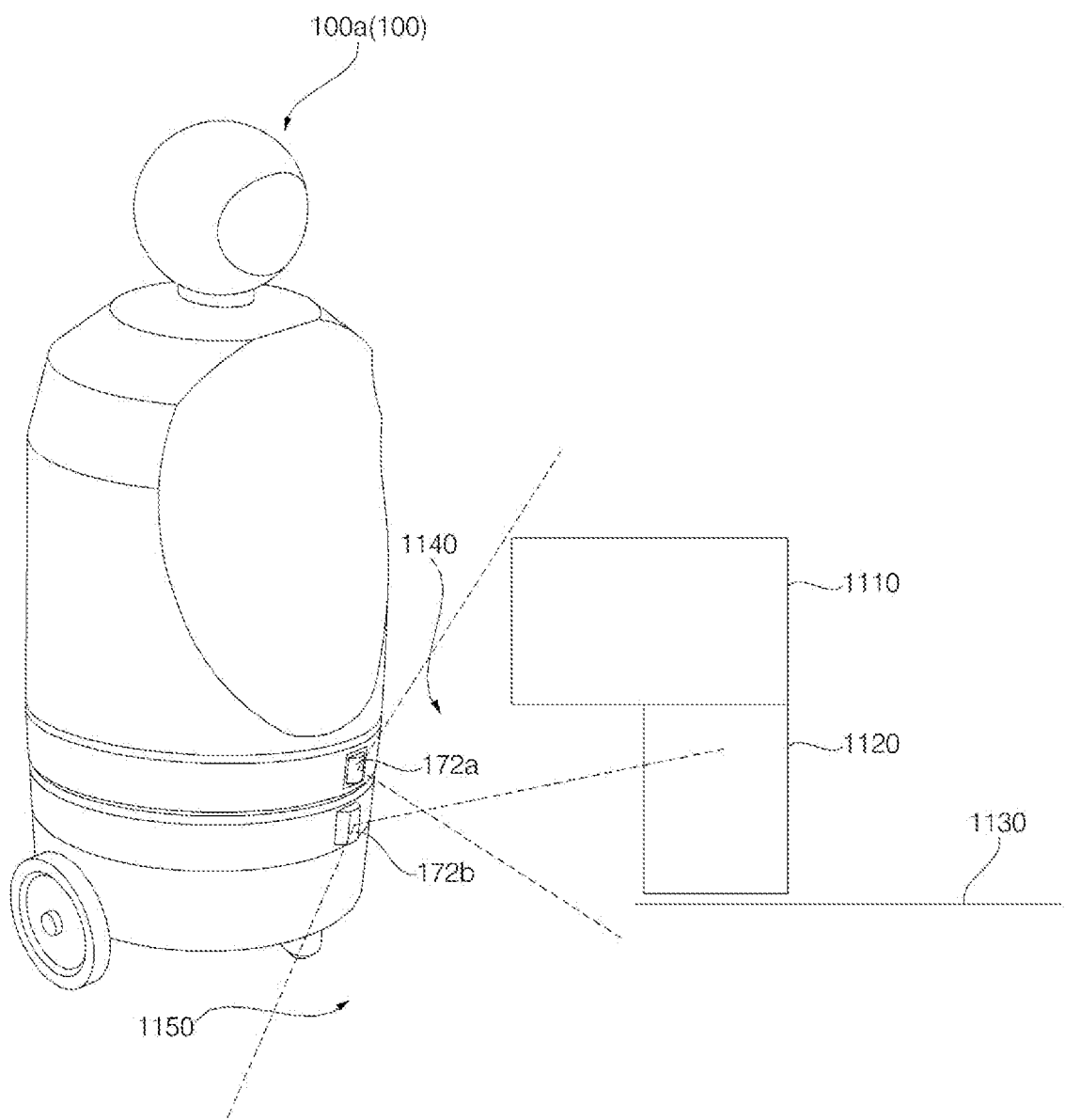
FIG. 11 is a diagram for explanation of a method of controlling a mobile robot according to an embodiment of the present invention.

FIG. 10 is a flowchart showing a method of controlling a mobile robot according to an embodiment of the present invention. FIG. 11 is a diagram for explanation of a method of controlling a mobile robot according to an embodiment of the present invention.

Referring to FIG. 10, the mobile robot 100 according to an embodiment of the present invention may acquire sensing data through the plurality of sensor modules 172a and 172b disposed on the rotation unit 170a during traveling (S1010) and the control unit 140 may analyze sensing data (S1020).

The guidance robot 100a illustrated in FIG. 11 may include the rotation unit 170a on which the depth sensor D and the LiDAR sensor L are stacked.

The control unit 140 may rotate the rotation unit 171a on which the depth sensor D is disposed to adjust a detection direction and a range 1140 of the depth sensor D, and may rotate the rotation unit 171b on which the LiDAR sensor L is disposed to adjust a detection direction and a range 1150 of the LiDAR sensor L.

It may be difficult to detect a shape of an object that is positioned at a short distance to cause collision in a traveling direction of the mobile robot 100 including the guidance robot 100a simply by planarly measuring the LiDAR sensor L.

For example, the LiDAR sensor L may accurately detect a wall 2 1120 immediately above a floor 1130 but a portion of an upper portion above the wall 2 1120 protrudes in a stereoscopic shape and it is difficult to accurately detect an entire shape of a wall 1 1110 that is closer to the mobile robot 100.

According to an embodiment of the present invention, when there is an object that is not detected by the LiDAR sensor L and is detected by the depth sensor D (S1030), the corresponding object may be selected as an object that is positioned at a short distance to cause collision (S1040).

The control unit 140 may rotate the rotation unit 171a on which the depth sensor D is disposed to fix a detection direction and a range 1140 of the depth sensor D to the object that is positioned at a short distance to cause collision as a target (S1050), Accordingly, the depth sensor D may monitor the 3D object to guide traveling for stereoscopically avoiding detection collision.

When the mobile robot 100 approaches the object that is positioned at a short distance to cause collision (S1060), avoidance traveling may be performed while a position of the object that is positioned at a short distance to cause collision is monitored through the depth sensor D (S1070).

Figure 12:
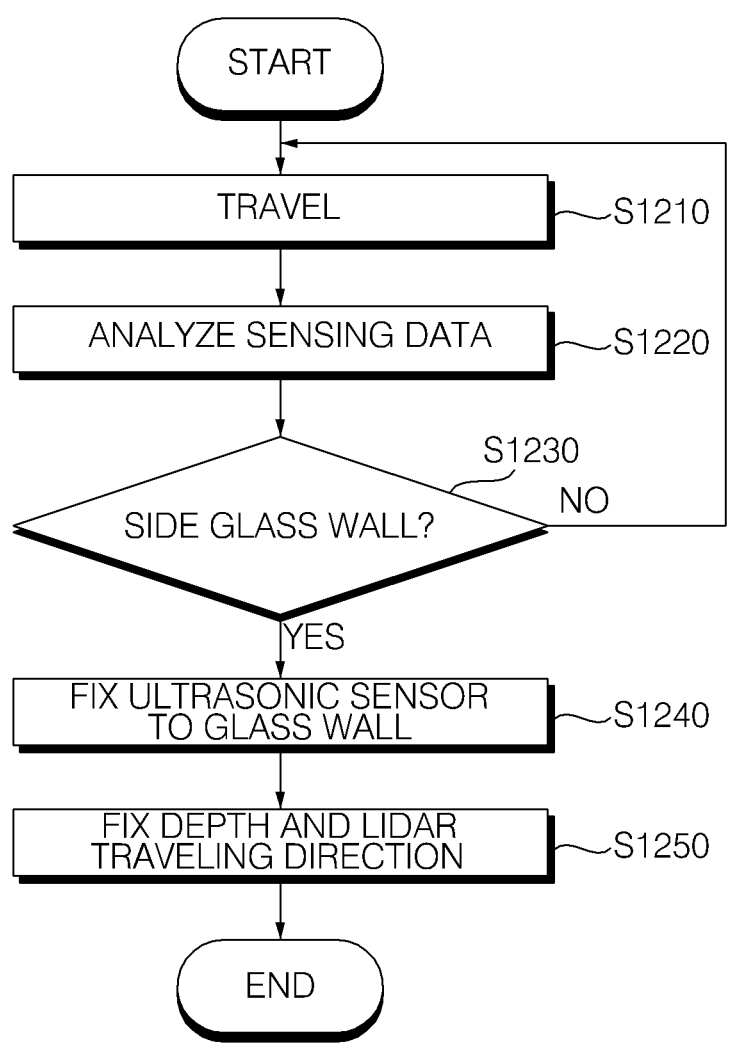
FIG. 12 is a flowchart showing a method of controlling a mobile robot according to an embodiment of the present invention.

FIG. 12 is a flowchart showing a method of controlling a mobile robot according to an embodiment of the present invention.

Referring to FIG. 12, the mobile robot 100 according to an embodiment of the present invention may acquire sensing data through the plurality of sensor modules 172a and 172b disposed on the rotation unit 170a during traveling (S1210) and the control unit 140 may analyze the sensing data (S1220).

The plurality of sensor modules 172a and 172b may include at least one ultrasonic sensor S. For example, any one of the plurality of sensor modules 172a and 172b may include the ultrasonic sensor S, and the other may include the depth sensor D, the LiDAR sensor L, or the like.

A specific objet may be detected only by a specific sensor. For example, a glass wall may be detected through the ultrasonic sensor S, but it is difficult to detect the glass wall through the depth sensor D, the LiDAR sensor L, or the like.

Accordingly, when a specific object such as a side glass wall is detected only by the ultrasonic sensor S (S1230), the control unit 140 may rotate the rotation unit 170a on which the ultrasonic sensor S is disposed, to fix a detection direction and a range of the ultrasonic sensor S to the side glass wall as a target (S1240).

The control unit 140 may fix the detection and range of the depth sensor D, the LiDAR sensor L, or the like to a forward side of a traveling direction, thereby enabling safe traveling forwards.

The mobile robot according to the present invention is not limited to the configurations and methods of the above-described embodiments. That is, the above-described embodiments may be partially or wholly combined to make various modifications.

Similarly, operations are illustrated in a specific sequence in the drawings, but it is not understood that these operations need to be performed in the time sequence or sequentially or all of the illustrated operations need to be performed for an appropriate result. In a specific case, multitasking or parallel processing may be advantageous.

The method of controlling the mobile robot according to an embodiment of the present invention may be implemented as processor-readable code stored in a processor-readable recording medium included in a network device. The processor-readable recording medium includes all kinds of recording media storing data readable by a processor. Examples of the processor-readable recording medium include any type of recording device for storing data readable by a processor. The processor-readable recording medium includes implementation as carrier waves such as transmission over the Internet. In addition, the processor-readable recording medium may be distributed to computer systems connected through a network, stored and executed as code readable in a distributed manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile robot comprising:
a main body group including at least two main bodies having physically different structures to provide different services depending on usage environment and purpose; and
a driving part configured to select one main body among the main body group according to a required service, to be physically coupled to the selected main body such that the driving part to be located under the selected main body, and to move the selected main body,
wherein the driving part includes:
a rotation part that is rotatably provided and is configured to dispose a sensor module that includes one or more sensors facing outwards from the rotation part,
a base positioned below the rotation part, and
a driving wheel coupled to the base.

2. The mobile robot of claim 1, wherein the rotation part includes a plurality of rotation parts that are stacked in upward and downward directions and are independently rotatable.

3. The mobile robot of claim 2, wherein the plurality of rotation parts are provided on different layers and include different types of sensors.

4. The mobile robot of claim 3, wherein the rotation part fixes one sensor, which detects a predetermined object, to detect the detected object and rotates remaining sensors to orient the remaining sensors in different directions among the different types of sensors.

5. The mobile robot of claim 1, wherein the rotation part includes a first sensor rotation part disposed at an upper side and a second sensor rotation part disposed at a lower side;
wherein a first sensor module including at least one of a light detection and ranging (LiDAR) sensor or a depth sensor is disposed on the first sensor rotation part; and
wherein a second sensor module including an ultrasonic sensor is disposed on the second sensor rotation part.

6. The mobile robot of claim 5, wherein the first sensor rotation part is rotated to orient a sensing direction of the first sensor module towards a non-detection area; and
wherein the second sensor rotation part is rotated to orient the ultrasonic sensor towards a forward side of a traveling direction.

7. A method of controlling a mobile robot that includes a main body group including at least two main bodies having physically different structures to provide different services depending on usage environment and purpose, and a driving unit configured to select one main body among the main body group according to a required service, and to physically couple to the selected main body, the method comprising:
selecting one main body among the main body group according to a required service;
structurally coupling the driving unit having a plurality of sensor modules to the selected main body;
acquiring sensing data through the plurality of sensor modules during traveling;
determining whether one or more of the sensor modules need to rotate based on the acquired sensing data;
determining a sensor module, from the plurality of sensor modules, as a rotation target when rotation is determined to be needed; and
rotating a rotation part disposed on the determined sensor module as the rotation target.

8. The method of claim 7, wherein the determining whether rotation is needed includes determining that rotation is needed when a non-detection area that is not previously detected is detected; and
wherein the rotating the rotation part includes fixing a rotation part, on which a sensor module including an ultrasonic sensor is disposed, to a front side in a traveling direction and rotating a rotation part, on which a sensor module including a LiDAR sensor is disposed, to orient a sensing direction of the LiDAR sensor towards the non-detection area.

9. The method of claim 7, wherein the determining whether rotation is needed includes determining that rotation is needed when some of the plurality of sensor modules detect a predetermined object and the others of plurality of the sensor modules do not detect the predetermined object; and
wherein the rotating the rotation part includes fixing at least one of the sensor modules, which detects the predetermined object, to detect the detected object, and rotating the rotation part to orient the remaining sensor modules in a different direction.

10. The method of claim 9, wherein the rotation part is operated to orient the remaining sensor modules towards a forward side of a traveling direction.

* * * * *